United States Patent
Robertson et al.

(10) Patent No.: US 10,358,796 B2
(45) Date of Patent: Jul. 23, 2019

(54) OPERATOR ASSIST FEATURES FOR EXCAVATING MACHINES BASED ON PERCEPTION SYSTEM FEEDBACK

(71) Applicant: Siemens Industry, Inc., Alpharetta, GA (US)

(72) Inventors: Daniel W. Robertson, Cumming, GA (US); Julian D. Jaeger, Atlanta, GA (US); Robert Eidenberger, München (DE)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 82 days.

(21) Appl. No.: 15/311,264

(22) PCT Filed: Jun. 24, 2015

(86) PCT No.: PCT/US2015/037419
§ 371 (c)(1),
(2) Date: Nov. 15, 2016

(87) PCT Pub. No.: WO2015/200483
PCT Pub. Date: Dec. 30, 2015

(65) Prior Publication Data
US 2017/0096797 A1    Apr. 6, 2017

Related U.S. Application Data

(60) Provisional application No. 62/016,875, filed on Jun. 25, 2014.

(51) Int. Cl.
*B60L 1/00* (2006.01)
*E02F 3/30* (2006.01)
(Continued)

(52) U.S. Cl.
CPC ............ *E02F 9/2037* (2013.01); *B60L 1/00* (2013.01); *E02F 3/48* (2013.01); *E02F 9/2033* (2013.01);
(Continued)

(58) Field of Classification Search
CPC ......... E02F 9/2037; E02F 9/2033; E02F 9/24; B60L 1/00
(Continued)

(56) References Cited

U.S. PATENT DOCUMENTS

| 5,321,637 A | 6/1994 | Anderson et al. |
| 6,377,872 B1 * | 4/2002 | Struckman ............. E02F 9/205 342/459 |

(Continued)

FOREIGN PATENT DOCUMENTS

| CN | 103124839 A | 5/2013 |
| CN | 103572690 A | 2/2014 |

(Continued)

OTHER PUBLICATIONS

PCT International Search Report and Written Opinion dated Dec. 7, 2015 corresponding to PCT Application PCT/US2015/037419 filed Jun. 24, 2015 (18 pages).

*Primary Examiner* — Krishnan Ramesh

(57) ABSTRACT

A system for an excavating machine includes a control system comprising a processing system, one or more sensors, a user interface, and a vision system, wherein the control system receives input signals from the user interface, the one or more sensors, and the vision system; and a motor in communication with the control system and the motor adapted to control movement of a portion of the excavating machine. The processing system can control operation of the motor.

19 Claims, 4 Drawing Sheets

(51) Int. Cl.
  *E02F 3/48* (2006.01)
  *E02F 9/20* (2006.01)
  *E02F 9/24* (2006.01)
  *E02F 9/26* (2006.01)
  *G05D 1/02* (2006.01)

(52) U.S. Cl.
  CPC .......... *E02F 9/2041* (2013.01); *E02F 9/2045* (2013.01); *E02F 9/2054* (2013.01); *E02F 9/24* (2013.01); *E02F 9/262* (2013.01); *E02F 9/265* (2013.01); *G05D 1/0257* (2013.01); *B60L 2200/40* (2013.01); *E02F 3/308* (2013.01); *G05D 2201/0202* (2013.01)

(58) Field of Classification Search
  USPC .......................................................... 701/22
  See application file for complete search history.

(56) References Cited

U.S. PATENT DOCUMENTS

| | | |
|---|---|---|
| 2005/0085929 A1 | 4/2005 | Koch et al. |
| 2008/0011839 A1 | 1/2008 | Noll et al. |
| 2008/0282583 A1 | 11/2008 | Koellner et al. |
| 2009/0259401 A1 | 10/2009 | Edwards et al. |
| 2013/0261885 A1 | 10/2013 | Hargrave, Jr. et al. |

FOREIGN PATENT DOCUMENTS

| | | |
|---|---|---|
| JP | 2004068433 A | 3/2004 |
| RU | 2134329 C1 | 8/1999 |
| SU | 682615 A1 | 8/1979 |
| WO | 9530799 A1 | 11/1995 |
| WO | 2012116408 A1 | 9/2012 |
| WO | 2014047238 A1 | 3/2014 |

\* cited by examiner

OPERATOR ASSIST FEATURES FOR EXCAVATING MACHINES BASED ON PERCEPTION SYSTEM FEEDBACK

CROSS REFERENCE TO RELATED APPLICATION

This application is the U.S. National Stage of International Application No. PCT/US2015/037419 filed 24 Jun. 2015 and claims benefit thereof, the entire content of which is hereby incorporated herein by reference. The International Application claims benefit under 35 U.S.C. § 119(e) of U.S. Provisional Patent Application No. 62/016,875, filed 25 Jun. 2014, the entire contents and substance of which is hereby incorporated by reference as if fully set forth herein.

BACKGROUND

1. Field

Aspects of the present invention relate to excavating machines and, more particularly, to excavating machines using operator assist features based on perception system feedback.

2. Description of Related Art

In general, excavating machines are large and expensive machines that are used to excavate large quantities of overburden and minerals. These excavating machines often include multiple motors controlling the operation of the various components of the excavating machine. In order to operate, excavating machine operators use a set of controls to simultaneously operate the multiple motors. Due to the size of the excavating machines and the complexity of the operation, the operators must be highly trained to properly and safely operate the excavating machines.

Despite extensive training, operators routinely make errors in the operation of the excavating machines, which can cause damage to the excavating machine and lead to down-time of the excavating machine and increased cycle time. The proficiency with which the operator can operate the excavating machine contributes significantly to the productivity of the excavating machine.

What is needed, therefore, is operator assist features for an excavating machine based on perception system feedback that reduces: (a) the likelihood that an operator error can cause damage to the excavating machine and (b) down-time of the excavating machine and increased cycle time.

SUMMARY

Briefly described, a control system of an electric rope shovel machine can be configured to measure the distance to a bank to be excavated. In exemplary embodiments, the control system of the electric rope shovel machine is configured to recognize, or otherwise identify, a haul truck in the vicinity of the electric rope shovel machine. Further, the control system can automatically maneuver the dipper of the excavating machine into a known position in response to a single command from the operator.

DETAILED DESCRIPTION

To facilitate an understanding of embodiments, principles, and features of the present invention, they are explained hereinafter with reference to implementation in illustrative embodiments. In particular, they are described in the context of systems and methods for excavating machines based on perception system feedback.

Embodiments of the present invention, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Although the systems and methods that may be described herein may be directed to either a dragline excavating machine or an electric rope shovel machine, the technology described can also be provided in various other excavating machines.

Figure 1:
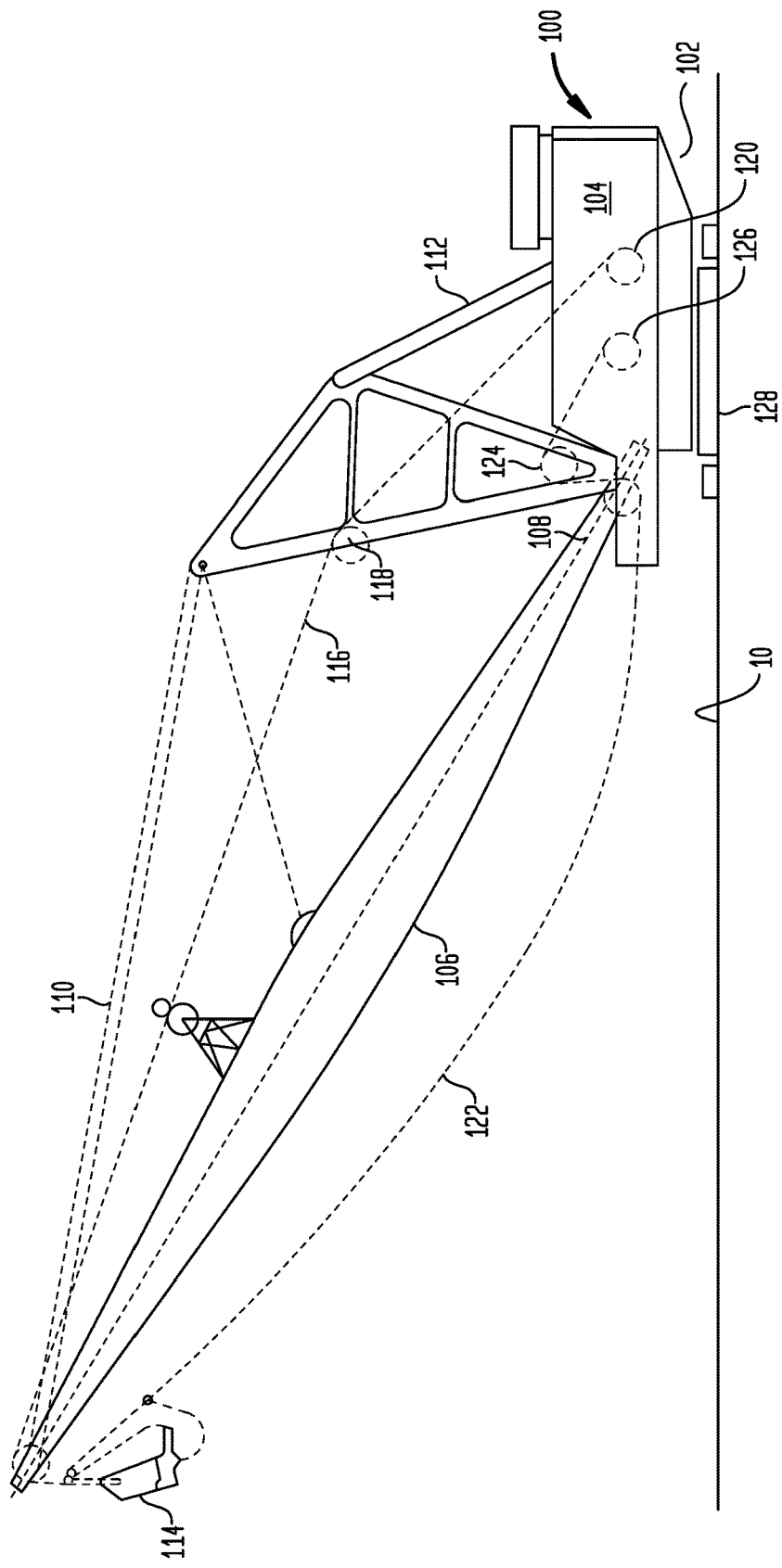
FIG. 1 is a perspective view of a dragline excavating machine, in accordance with an exemplary embodiment of the present invention.

Referring now to FIG. 1, a portion of a dragline excavating machine 1 is shown. The dragline excavating machine 100 includes of a base 102, which rests upon the ground 10 and supports a machinery house 104. The machinery house 104 includes a boom 106 projecting upwardly from a lower front of the house 104. The boom 106 includes a foot, which is connected to the house by foot pins 108. In exemplary embodiments, the boom 106 can be held at the desired angle of inclination by means of suspension cables 110 extending from the boom 106 to an A-frame 112 mounted on top of the house 104. A bucket 114 can be suspended by hoist ropes 116, which may pass over sheaves 118 on the mast to wind on hoist drums 120 in the house 104.

During operation, the bucket 114 can be moved toward the dragline excavating machine 100 by drag ropes 122 passing over fairleads 124, located near the boom foot pins 108 and onto drag drums 126 in the machinery house 104. The dragline excavating machine 100 is carried by a walking mechanism 128, which allows the dragline excavating machine 100 to be moved from one location to another or relocated. The walking mechanism 128 includes a shoe that is conventionally driven internally by drive systems including an internal motor and gear assembly.

The dragline excavating machines 100 are primarily used to dig below their working level and to dump at an elevated level. The digging cycle consists of five components: (1) drag to fill, (2) hoist and swing to dump, (3) dump, (4) lower and return swing, and (5) position bucket.

The dragline cycle begins with the bucket lowered in a pit and positioned to penetrate a bank. Dragging it into the face can fill the bucket with media. Once filled, hoisting and drag pay out commences, followed by swinging as the bucket clears the trench. As the bucket swings and climbs, proper tension between the hoist and drag controls holds the bucket in the carry position. As the dumping location is approached, the swing control is reversed to stop swinging and the drag is allowed to pay out until the bucket is tilted and dumps its load. Due to the swinging inertia of the machine, the direction of swing will not change for several seconds after the controls are reversed, giving the bucket time to dump without delay. During the return swing, the hoist is lowered and the drag is reeved in so as to begin the positioning of the bucket for the next load. The swing control is reversed to stop the swing motion, and then neutralized as the bucket settles into position. The proficiency with which these functions are carried out contributes significantly to the productivity of the machine and the speed at which the task is completed.

Figure 2:
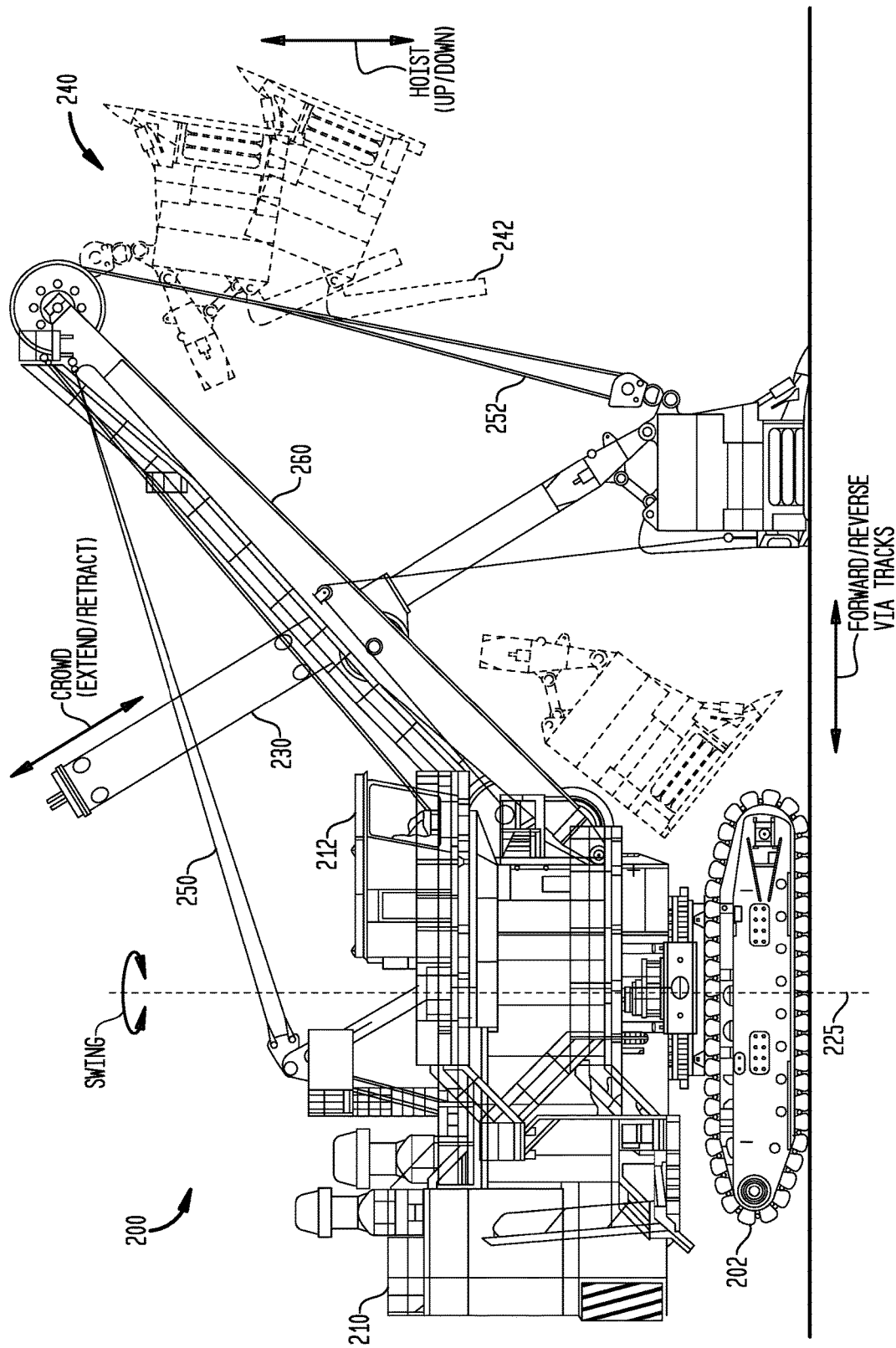
FIG. 2 is a perspective view of an electric rope shovel machine, in accordance with an exemplary embodiment of the present invention.

FIG. 2 depicts an exemplary electric rope shovel machine 200. The electric rope shovel machine 200 includes tracks 202 for propelling and turning the electric rope shovel machine 200 forward and backward (i.e., the process of turning the machine 200 can be accomplished by varying the speed and/or direction of the left and right tracks relative to each other).

The electric rope shovel machine 200 includes a machine house 210 and a cab 212. The machine house 210 is able to swing or swivel about a swing axis 225, for instance, to move from a digging location to a dumping location. The electric rope shovel machine 200 also includes a handle 230 supporting a dipper 240. The dipper 240 includes a door 242 for dumping contents.

The electric rope shovel machine 200 also includes suspension cables 250 coupled between the machine house 210 and boom 260 for supporting the boom 260; a hoist cable 252 attached to a drum, which may be positioned within the machine house 210 for winding the cable 252 to raise and lower the dipper 240 and a crowd motor for extending and retracting the handle 230.

When the tracks 202 of the electric rope shovel 200 are static, the dipper 240 is operable to move based on three control actions: (1) hoist, (2) crowd, and (3) swing. As noted, the hoist control is adapted to raise and lower the dipper 240 by winding and unwinding hoist cable 252. In exemplary embodiments, the hoist cable 252 can be wound on a large drum driven by an AC motor, routed through sheaves (pulleys), and support the bucket assembly from the boom 260. In addition, the crowd control can extend and retract the position of the handle 230 and dipper 240. The swing control rotates the machine house 210 relative to the swing axis 225 (see, e.g., FIGS. 3A-C). By skillful maneuvering of the hoist cables 155 and the crowd handle assembly, the bucket is controlled for filling with media and dumping, for example, of same in a haul truck for excavation purposes. Before dumping its contents, the dipper 240 can be maneuvered to the appropriate hoist, crowd, and swing position to (1) ensure the contents do not miss the dump location 270; (2) the door 242 does not hit the dump location 270 when released; and/or (3) the dipper 240 is not too high, such that the released contents would damage the dump location 270 or cause other undesirable results.

Figure 3A:
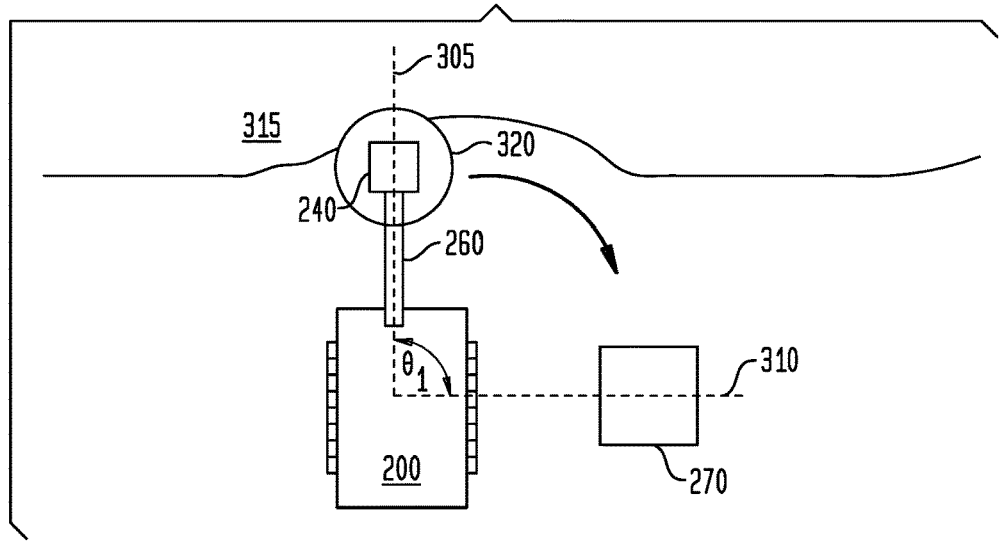
FIGS. 3A, 3B and 3C depict a swing cycle of an electric rope shovel machine between a dig location and a dumping location, in accordance with exemplary embodiments of the present invention.
Figure 3B:
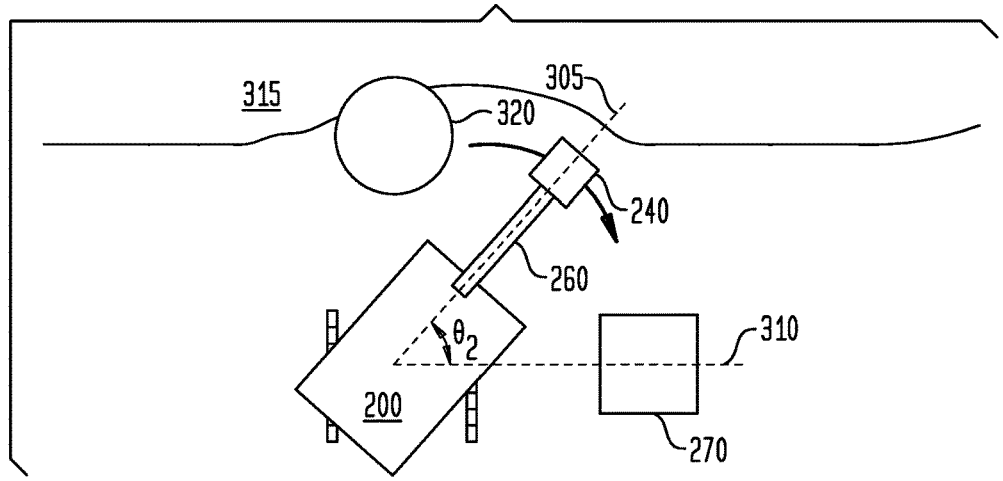
Figure 3C:
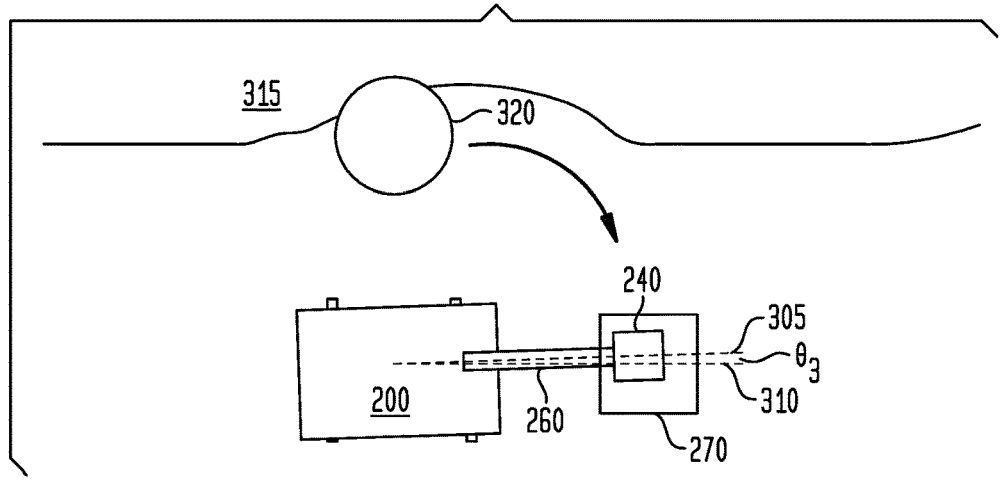

FIGS. 3A-3C depicts exemplary swing angles of the electric rope shovel machine 200 moving from a dig position to a dump position. For illustrative purposes, a boom axis 305 and dump position axis 310 are overlaid on FIGS. 3A-C, with the swing axis 225 being the intersection of the boom axis 305 and dump position axis 310. The angle between the handle axis 305 and the dump position axis 310 is referred to as $\theta$. In FIG. 3A, the dipper 240 can dig into bank 315 at a dig location 320, and $\theta=\theta_1$. After digging, the electric rope shovel 200 begins to swing the boom 260 towards the dump location 270. Next, as shown illustratively in FIG. 3B, the boom 260 is mid-way through the swing-to-dump and $\theta=\theta_2$. In FIG. 3C, the boom 260 has stopped over the dump location 270 and the door 242 can be released to dump the materials within the dipper 240 into the dump location 270, at which $\theta=\theta_3$.

Figure 4:
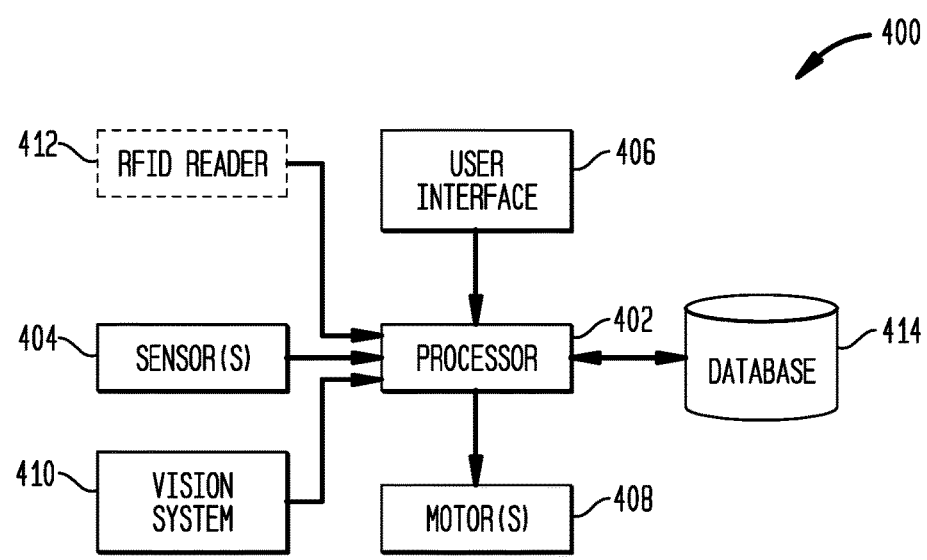
FIG. 4 is a block diagram of a control system for an excavating machine, in accordance with an exemplary embodiment of the present invention.

FIG. 4 shows a block diagram of a control system 400 for an electric rope shovel machine in accordance with an exemplary embodiment. As illustrated, the control system 400 may include a processor 402, one or more sensors 404, a user interface 406, one or more motors 408, and a vision system 410. In exemplary embodiments, the processor 402 receives input signals from the user interface 406, the one or more sensors 404, and the vision system 410, and can responsively control the operation of the one or more motors 408.

In exemplary embodiments, the processor 402 may be a digital signal processing (DSP) circuit, a field-programmable gate array (FPGA), an application specific integrated circuits (ASICs) or the like. The processor 402 can be any custom made or commercially available processor, a central processing unit (CPU), an auxiliary processor among several processors, a semiconductor based microprocessor (in the form of a microchip or chip set), or generally many devices for executing instructions. The processor 402 may include or be coupled to a memory and a transceiver. The processor 402 may communicate with the plurality of sensors 404 wirelessly or via wired connections.

The one or more sensors 404 may include a wide variety of sensors disposed in various location on the machine and can monitor a wide variety of operating conditions of the machine. For example and not limitation, the operating conditions of the machine include, but are not limited to, the position of the handle, the position of the dipper, the weight of the material in the dipper, the torque on the handle, the swing position, the crowd speed, the hoist speed, a crowd angle, and the like. In exemplary embodiments, the processor 402 monitors the reading received from the one or more sensors 404 and can actively limit the operation of the one or more motors 408.

For example and not limitation, with the dipper empty the maximum lower speed may be set to a first level and with the dipper having over a threshold load, the maximum lower speed may be set to a second level lower than the first level. In such cases, the processor 402 can determine the load in the dipper based on the readings from the one or more sensors 404, and the processor 402 may limit the maximum lower speed. Exemplary, if the operator, through for instance the user interface 408, attempts to lower at maximum velocity the processor 402 can override and thus limit the maximum velocity based on the detected load.

In exemplary embodiments, the vision system 410 may include one or more radar sensors and/or one or more laser sensors that are configured to scan the environment that the machine is operating in and to create a three dimensional model that includes the operating environment and the electric rope shovel machine. This three dimensional model can be used by the processor 402 of the control system 400, in combination with reading from the one or more sensors 404, to control the operation of the machine.

The machine oftentimes operates at its peak efficiency when it is located at an ideal distance from the bank when excavating the bank. If the electric rope shovel machine is located too far from the bank, the dipper may not be efficiently filled during its pass through the bank and therefore be underutilized. In many cases, the operator of the electric rope shovel machine is not able to properly position the electric rope shovel machine relative to the bank because the operator is not able to accurately determine the distance between the electric rope shovel machine and the bank. In order to overcome this and improve performance, in exemplary embodiments, the control system 400 of the machine is configured to measure the distance to a bank to be excavated. The control system 400 may use the vision system 410 to determine how far away from a bank the electric rope shovel machine is located. In exemplary embodiments, the control system 400 may monitor the distance to the bank and may provide the operator with the current distance to the bank via the user interface. In other exemplary embodiments, the actual distance to the bank may not be provided to the operator but the user interface may provide an indication to the operator that the electric rope shovel machine is either too close or too far from the bank. These indications can be determined by threshold values stored by the processor for the ideal distance to the bank for the electric rope shovel machine.

In exemplary embodiments, the excavating machines dump the material into large haul trucks that are used to transport away the material. In most cases, the hauling capacity of these trucks exceeds the capacity of the dipper of the electric rope shovel machine. Accordingly, in order to fill the truck the electric rope shovel machine must dump multiple loads into the haul trucks. In exemplary embodiments, a wide variety of haul trucks may be used by a single electric rope shovel machine at a dig site. In such cases, the operator of the electric rope shovel machine must be able to identify the hauling capacity of each of the various trucks and fill the trucks to their capacity in order to full utilize each of the trucks. Oftentimes, the operator may not properly estimate the hauling capacity of a truck and as a result the truck can be either be underutilized or overloaded.

In exemplary embodiments, the control system 300 of the electric rope shovel machine is configured to recognize, or otherwise identify, a haul truck in the vicinity of the electric rope shovel machine. In one embodiment, each of the haul trucks may include one or more radio frequency identification (RFID) tags that are used by the control system to identify the haul truck, and optionally the bed of the haul truck. In such embodiments, the control system 300 may use a RFID reader 312 to read an identification number from the RFID tags. The control system 300 may then use the processor 302 to look up the identification number in a database 314 to identify the haul capacity, or other desired characteristics, of the haul truck.

In another embodiment, the vision system 410 of the control system 400 may be configured to capture an image of the haul truck. The image of the haul truck may be compared by the processor 402 to a set of known haul truck images stored in the database 414 to identify the type of the haul truck. Once the type of the haul truck is identified the processor may use the database 414 to identify the haul capacity, or other desired characteristics, of the haul truck.

In exemplary embodiments, once the control system 400 determines the type of the haul truck and its hauling capacity, the control system 400 may display the hauling capacity to the operator of the electric rope shovel machine via the user interface 406. In addition, the user interface may be configured to display a remaining load capacity of the haul truck based on the hauling capacity and the amount of soil dumped by the electric rope shovel machine into the haul truck.

As discussed above, the machines include multiple motors that each control the operation of one of the various components of the machine and the operators use a set of controls to simultaneously operate the multiple motors in order to control the operation of the machine. In multiple points during the operation of the machine, the operator maneuvers the dipper or bucket of the machine into one or more known positions. For example, at the end of each shift the operator may be required to maneuver the machine into a park position, as shown in FIG. 2. In another example, the operator may be required to maneuver the machine into a tuck position, as shown in FIG. 2, after dumping the dipper load and before beginning a new excavation operation. Currently, all motions of the machine are simultaneously and manually controlled by the operator. Accordingly, in order to return the dipper to a known position, while avoiding contact with the crawlers below or the bumper on the boom, the operator often maneuvers the machine at a reduced speed.

In exemplary embodiments, the control system 400 is configured to automatically maneuver the dipper of the electric rope shovel machine into a known position in response to a single command from the operator. In exemplary embodiments, the known position may include, but is not limited to, a tuck position, a park position or a custom position. In exemplary embodiments, the user interface 406 may include one or more known position buttons that can be used by the operator to instruct the control system to maneuver the electric rope shovel machine into a known position. In exemplary embodiments, one or more known positions may pre-programed into the memory of the processor 402. In addition, the control system 400 may allow a user to create a customized known position by modifying a default known position or creating a new known position.

In exemplary embodiments, upon the processor 402 receiving a command to maneuver the electric rope shovel machine into a known position, the processor 402 determines the current position of the electric rope shovel machine and calculates the most efficient path to maneuver from the current position into the desired known position. In exemplary embodiments, the processor 402 may also utilize information provided by the vision system 410 and/or the sensors 404 in determining the path to be used for maneuvering from the current position into the desired known position. For example, the processor 402 may use the vision system 410 to determine if there are any obstructions in the calculated path between the current position and the desired known position. In the event that the processor 402 determines that there is an obstruction in the calculated path between the current position and the desired known position, the processor 402 will attempt to calculate an alternate path around the obstruction. In the event that no alternate path is available, the processor 402 may notify the operator, via the user interface 406, that it cannot maneuver the electric rope shovel machine into the desired known position due to an obstruction in the way. In exemplary embodiments, during the automated movement of the electric rope shovel machine the control system 400 may allow the operator to manually override the automated movement.

In exemplary embodiments, the control system 400 reduces inefficiencies that may occur by having the operator manually maneuver the electric rope shovel machine from one position into another. In addition, the control system 400 can ensure that the machine is consistently placed in the correct known position while avoiding any obstructions in the path of the machine. Furthermore, the control system 400 can eliminate delays and increase safety by using automation to return the machine to a park or tuck position.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A system for an excavating machine comprising:
   a control system comprising a processing system, one or more sensors, a user interface, and a vision system, wherein the control system receives input signals from the user interface, the one or more sensors, and the vision system; and
   a motor in communication with the control system and the motor adapted to control movement of a portion of the excavating machine, wherein the control system is adapted to control operation of the motor,
   wherein, in order to identify a hauling capacity of a haul truck, the vision system of the control system is configured to capture an image of the haul truck, wherein the image of the haul truck is compared by the processing system to a set of haul truck images stored in a database to identify a type and the haul capacity of the haul truck, and
   wherein the control system is configured to display the hauling capacity of the haul truck to the operator of the excavating machine via the user interface, and wherein the control system is further configured to display a remaining load capacity of the haul truck based on the hauling capacity and amount of soil dumped by the excavating machine into the haul truck.

2. The system of claim 1, the processing system comprising one of a digital signal processing circuit, a field gate array, or an application specific integrated circuit, and in communication with a storage device.

3. The system of claim 1, the one or more sensors carried by the excavating machine and adapted to monitor operating conditions of the excavating machine.

4. The system of claim 3, the one or more sensors monitoring operating conditions of the excavating machine including a location of a handle of the excavating machine.

5. The system of claim 3, the one or more sensors monitoring operating conditions of the excavating machine including a location of a dipper of the excavating machine.

6. The system of claim 3, the one or more sensors monitoring operating conditions of the excavating machine including an amount of weight of material in a dipper of the excavating machine.

7. The system of claim 3, the one or more sensors monitoring operating conditions of the excavating machine including an amount of torque on a handle of the excavating machine.

8. The system of claim 3, the one or more sensors monitoring operating conditions of the excavating machine including a swing movement of the excavating machine.

9. The system of claim 3, the one or more sensors monitoring operating conditions of the excavating machine including a crowd swing of the excavating machine.

10. The system of claim 3, the one or more sensors monitoring operating conditions of the excavating machine including a hoist speed of the excavating machine.

11. The system of claim 3, the one or more sensors monitoring operating conditions of the excavating machine including a crowd angle of the excavating machine.

12. The system of claim 3, wherein the processing system monitors readings received from the one or more sensors and, based on the readings, actively limits operation of the motor.

13. The system of claim 1, the machine carrying a dipper; the processing system adapted to determine a load in the dipper based on data received from the one or more sensors; and the control system controlling the speed of movement of the dipper.

14. The system of claim 1, the vision system comprising one or more radar sensors configured to scan an area about the machine; the processing system creating a three dimensional model of objects in the surroundings; and the control system using the model to control operation of the machine.

15. The system of claim 1, the processing system determining the location of the machine from a bank to determine an ideal distance for machine operation to maximize efficiency.

16. The system of claim 15, the control system using the vision system to determine the distance the machine is from a bank.

17. The system of claim 16, the control system continuously monitoring the distance from the machine to the bank.

18. The system of claim 16, the control system displaying the distance of the machine to the bank with the user interface.

19. The system of claim 1, wherein the control system is configured to recognize the haul truck in vicinity of the excavating machine, the control system recognizing the haul truck in vicinity via a radio frequency identification system.

* * * * *